United States Patent [19]

Beal

[11] Patent Number: 4,743,729
[45] Date of Patent: May 10, 1988

[54] APPARATUS FOR ELECTRICAL DISCHARGE MACHINING OF A CIRCUMFERENTIAL SECTION FROM A BORE IN A METALLIC CYLINDER

[75] Inventor: William S. Beal, Winter Springs, Fla.

[73] Assignee: Westinghouse Electric Corp., Pittsburgh, Pa.

[21] Appl. No.: 69,569

[22] Filed: Jul. 6, 1987

[51] Int. Cl.$^4$ .......................... B23H 7/10; B23H 7/06
[52] U.S. Cl. ............................... 219/69 W; 204/206; 204/224 M; 219/69 M
[58] Field of Search .............. 219/69 W, 69 M, 69 D; 204/206, 224 M

[56] References Cited

U.S. PATENT DOCUMENTS

| | | | |
|---|---|---|---|
| 4,333,000 | 6/1982 | Shimizu | 219/69 W |
| 4,438,312 | 3/1984 | Inoue | 219/69 M |
| 4,584,451 | 4/1986 | Inoue | 219/69 W |
| 4,596,916 | 6/1986 | Inoue | 219/69 M |
| 4,629,855 | 12/1986 | Inoue | 219/69 M |

FOREIGN PATENT DOCUMENTS 177822  9/1985  Japan ............................ 219/69 W Primary Examiner—A. D. Pellinen
Assistant Examiner—Geoffrey S. Evans

[57] ABSTRACT

Apparatus for the electrical discharge machining of a circumferential section from the wall of a bore in a metallic cylinder has a housing and a wire electrode guide disposed within the housing. A wire feeder continuously feeds a wire electrode to the wire electrode guide. The wire electrode guide also moves the wire electrode radially into and out of an axial groove extending between the circumferential grooves in the bore wall. The wire electrode guide further moves a wire electrode, when the wire electrode is disposed within the axial groove in the bore wall, between a first position in which the distance along the bore wall between the point where the wire electrode enters and leaves the axial groove is the same as the distance between the circumferential grooves, and a second position in which the distance along the wall of the bore between the point where the wire electrode enters and leaves the axial groove is greater than the distance between the circumferential grooves. A rectifier and current controller provide an electrical discharge through the wire electrode. A motor resolver rotates the wire electrode guide circumferentially within the bore.

13 Claims, 5 Drawing Sheets

APPARATUS FOR ELECTRICAL DISCHARGE MACHINING OF A CIRCUMFERENTIAL SECTION FROM A BORE IN A METALLIC CYLINDER

BACKGROUND OF THE INVENTION

The invention relates to apparatus for electrical discharge machining of a circumferential section from a bore in a metallic cylinder, and more particularly, to such apparatus for machining a circumferential section having an axial cross-section in the shape of an isosceles trapezoid from a rotor.

To ensure the continued safe operation of a turbine or generator rotor beyond its original design life, it is necessary to periodically evaluate the condition of the rotor. The condition of the rotor can be analyzed through various nondestructive and destructive techniques. It is preferred, where possible, to use nondestructive methods to evaluate the rotor so as not to further mechanically weaken the rotor through destructive procedures. However, data obtained through use of even the most advanced nondestructive techniques, such as the use of eddy currents, are difficult to quantify, and thus are not generally useful in determining the life expectancy of the rotor. Therefore, information necessary to make a reliable assessment of the life expectancy of the rotor must be obtained through destructive methods.

Normally, such destructive procedures require that samples be taken from all critical locations of the rotor, that is, those locations subject to particularly high operating stresses. Thus, because the rotor bore is one such critical location, the rotor bore must be examined in order to properly assess the condition of the rotor. However, because the rotor bore is difficult to access to obtain a sample therefrom, it has been heretofore impossible to reliably evaluate the condition of the wall of the rotor bore.

Thus it is desired to develop apparatus that is capable of obtaining a sample section of the wall of the rotor bore that can be used to evaluate the condition of the wall of the rotor bore. It is further desired that the shape of the sample section be such that the continued operation of the rotor is not significantly adversely affected by the removal of the section.

SUMMARY OF THE INVENTION

The invention provides apparatus for the electrical discharge machining of a circumferential section from the wall of a bore in a metallic cylinder having a pair of spaced, radially outwardly extending circumferential grooves therein. The apparatus comprises a housing and wire electrode guide means disposed within the housing. A feeding means continuously feeds a wire electrode to the wire electrode guide means. Means associated with the wire electrode guide means moves a wire electrode radially into and out of a formed axial groove extending between the circumferential grooves in the wall of the bore. Means associated with the wire electrode guide means moves a wire electrode, when the wire electrode is disposed within the axial groove in the wall of the bore, between a first position in which the distance along the wall of the bore between the point where a wire electrode enters and leaves the axial groove is the same as the distance between the circumferential grooves, and a second position in which the distance along the wall of the bore between the point where the wire electrode enters and leaves the axial groove is greater than the distance between the circumferential grooves. Electrical discharge means provides an electrical discharge through the wire electrode. Rotating means rotates the housing circumferentially within the bore.

The apparatus of the invention is particularly useful for obtaining a sample section from the wall of a rotor bore. Heretofore, obtaining such a sample has been almost impossible because of the difficulty in accessing the rotor bore. Further, the removal of the sample section using the apparatus of the invention, does not significantly adversely affect the continued operation of the rotor.

The invention also provides a method for the electrical discharge machining of a circumferential section from the wall of a bore in a metallic cylinder having a pair of spaced, radially outwardly extending grooves therein.

BRIEF DESCRIPTION OF THE DRAWINGS

These and other objects, features and advantages of the subject invention will become more fully apparent from the following detailed description and accompanying drawings in which.

DETAILED DESCRIPTION OF THE PREFERRED EMBODIMENTS

Figure 1:
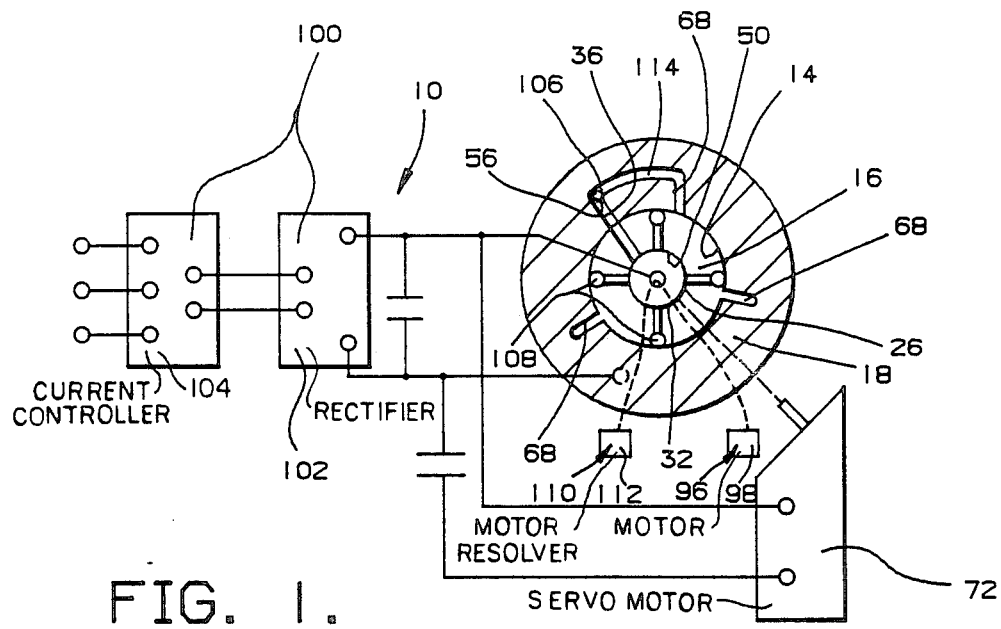
FIG. 1 is a schematic view of the apparatus of the invention.
Figure 2:
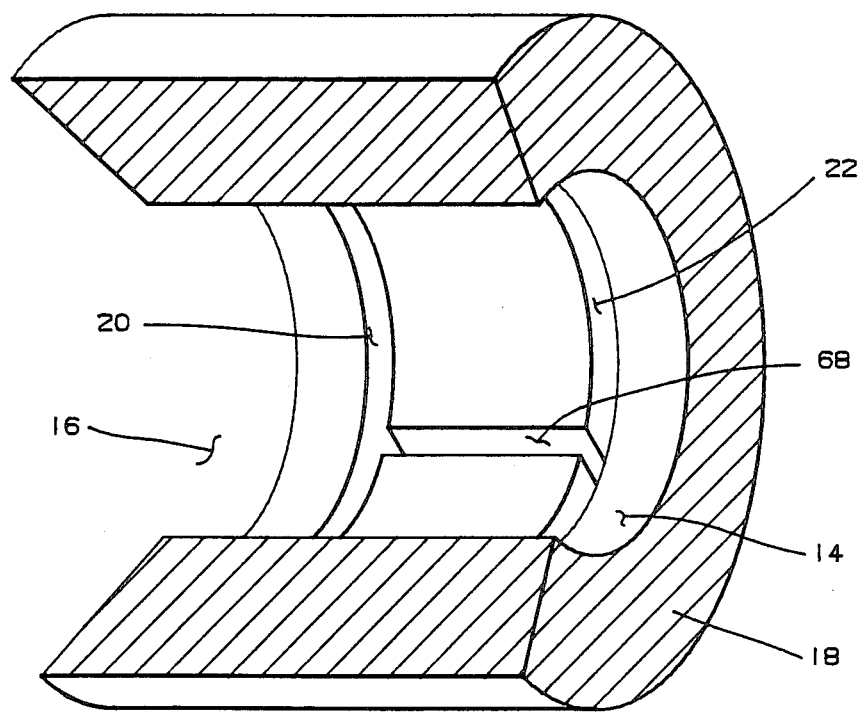
FIG. 2 is a perspective view of a rotor, with the rotor partly broken away, showing the circumferential grooves therein.

The apparatus 10 of the invention provides for the electrical discharge machining of a circumferential section 12 from the wall 14 of a bore 16 in a metallic cylinder, such as a rotor 18. The rotor 18 has a pair of spaced, radially outwardly extending circumferential grooves 20 and 22 formed therein by conventional procedures. Preferably, the circumferential grooves 20 and 22 are premachined into the wall 14 of the bore 16 so that they are approximately 5 inches apart and approximately 1½ inches deep. The apparatus 10 of the invention positions a wire electrode 24 within the bore 16 of the rotor 18 and applies an electromotive force to the wire electrode 24 in order to remove the circumferential section 12 from the wall 14 of the bore 16 of the rotor 18.

Figure 3:
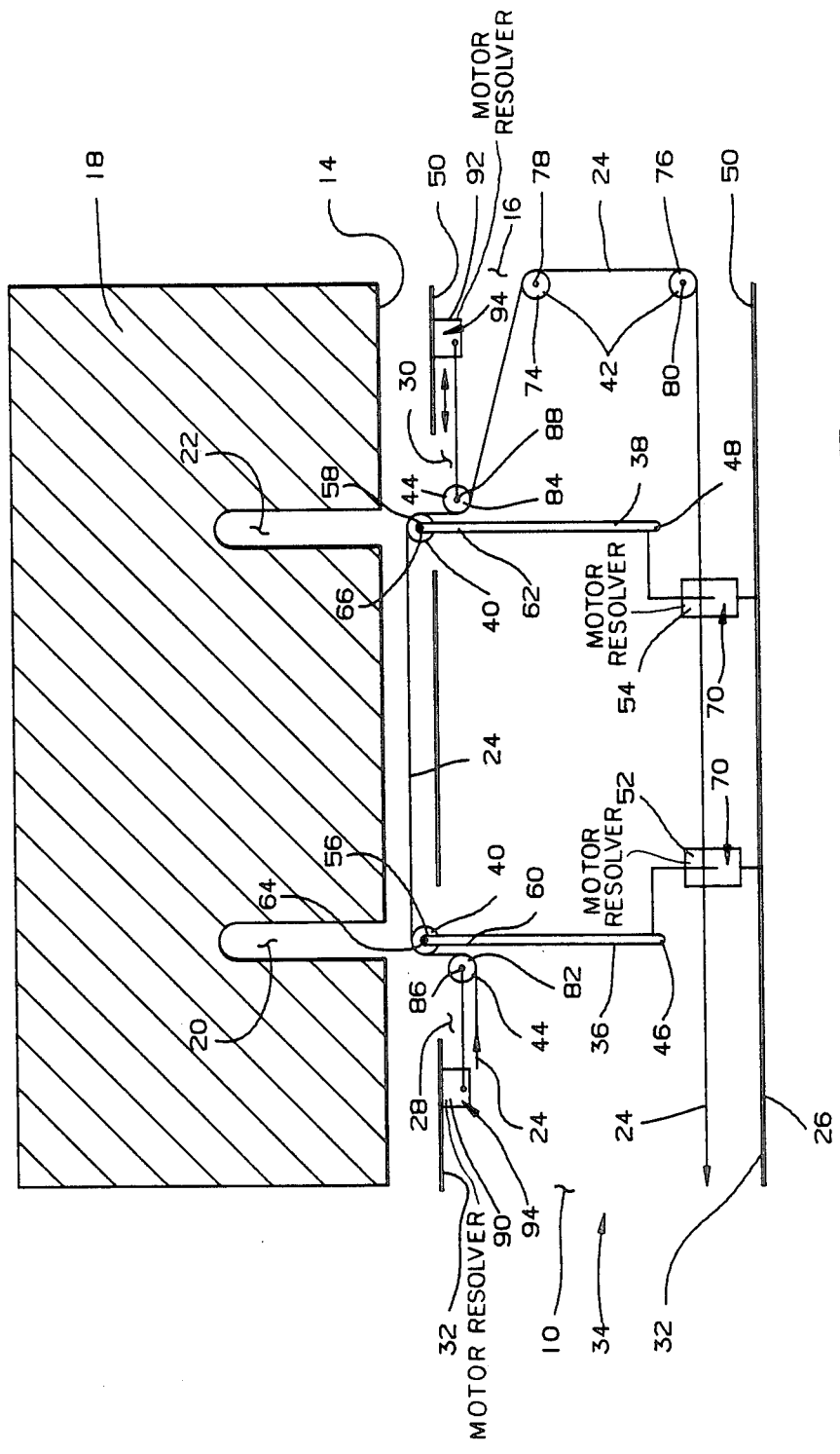
FIG. 3 is a schematic sectional view of a portion of the apparatus of the invention in place within the bore of a rotor, taken along a line through an axial groove in the wall of the bore of the rotor.

The apparatus 10 of the invention includes a housing, such as an elongated cylinder 26 (FIG. 3). The elongated cylinder 26 includes openings 28 and 30 in the wall 32 of the elongated cylinder 26 through which a wire electrode guide means 34 extends. The openings 28 and 30 are disposed along a line that is generally parallel to the longitudinal axis of the elongated cylinder 26.

The wire electrode guide means 34 is disposed within the elongated cylinder 26. Preferably, the wire electrode guide means 34 includes a pair of generally parallel rods 36 and 38, and first, second and third pairs of guide rollers, labeled 40, 42 and 44, respectively.

The first end 46 of the rod 36 and the first end 48 of the rod 38 are secured to the inner surface 50 of the wall 32 of the elongated cylinder 26 by motor resolvers 52 and 54 for radially extending and retracting rods 36 and 38, respectively. For example, the motor resolvers 52 and 54 can include a gear and shaft mechanism. The first pair of guide rollers 40, labeled 56 and 58, are mounted on the second end 60 of the rod 36 and the second end 62 of the rod 38, respectively, by pins 64 and 66, respectively. The guide rollers 56 and 58 can include means such as circumferential grooves, not shown, to serve as channels for the wire electrode 24 to prevent the wire electrode 24 from slipping on the guide rollers 56 and 58.

Figure 4:
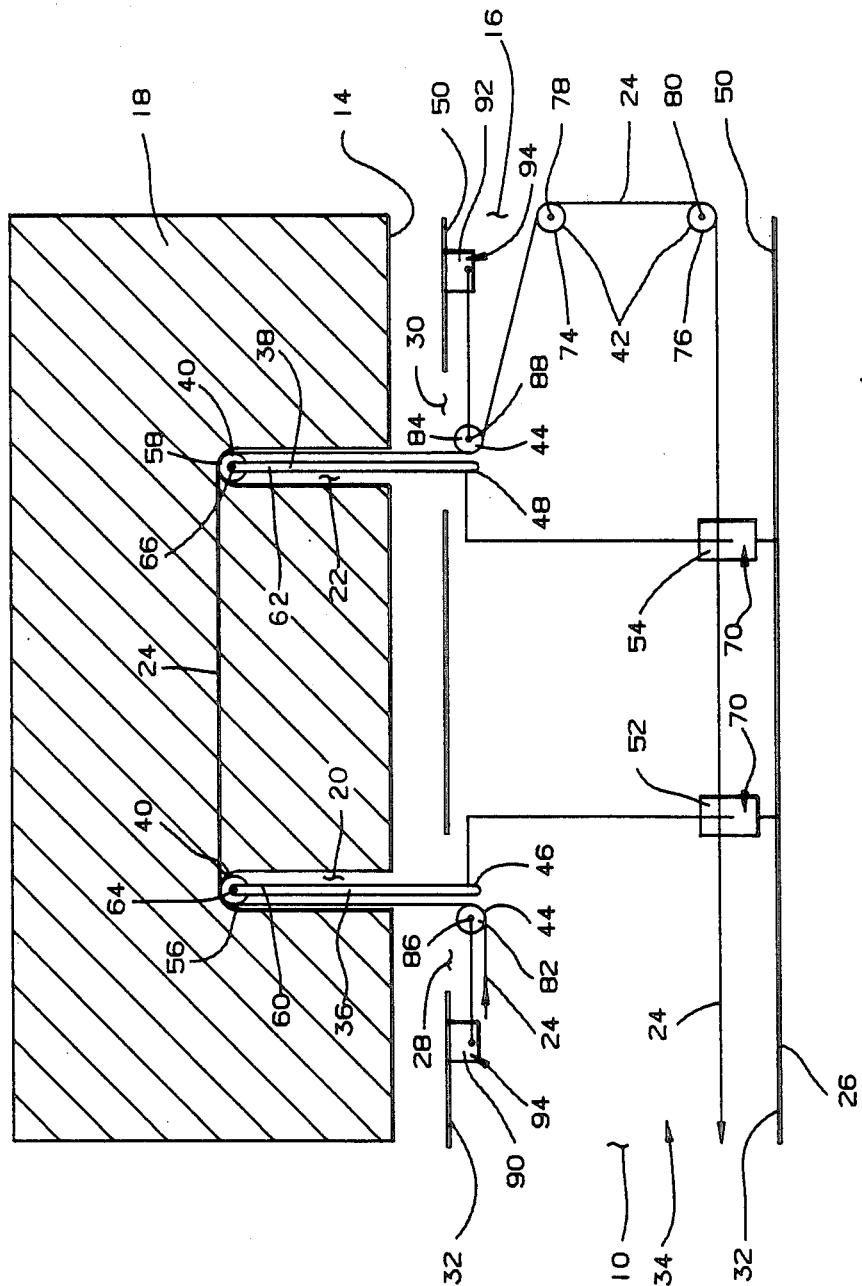
FIG. 4 is a schematic sectional view of the portion of the apparatus of the invention shown in FIG. 3, showing the wire electrode disposed within the circumferential grooves in the wall of the rotor bore.

The rods 36 and 38 are adapted for radial movement back and forth between the elongated cylinder 26 and the circumferential grooves 20 and 22 in the wall 14 of the bore 16 in order to form, and move the wire electrode 24 radially into and out of, an axial groove 68 in the wall 14 of the bore 16. The rods 36 and 38 extend from the elongated cylinder 26 through the openings 28 and 30, respectively, in the wall 32 of the elongated cylinder 26 extended, the second ends 60 and 62, including the guide rollers 56 and 58, of the rods 36 and 38 are disposed within the circumferential grooves 20 and 22, respectively, in the wall 14 of the bore 16 (FIG. 4).

The radial movement of the rods 36 and 38 is preferably controlled by a means 70, associated with the wire electrode guide means 34, for moving the wire electrode 24 radially into and out of the formed axial groove 68 extending between the circumferential grooves 20 and 22 in the wall 14 of the bore 16. The means 70 can be any suitable device, such as the motor resolvers 52 and 54, that will cause the rods 36 and 38 to move into and out of the circumferential grooves 20 and 22 in the wall 14 of the bore 16. Preferably, a servo-motor 72 sends an electrical signal to the motor resolvers 52 and 54 for radially extending and retracting rods 36 and 38, respectively. The motor resolvers 52 and 54, in turn, extend or retract the rods 36 and 38.

The second pair of guide rollers 42 includes guide rollers 74 and 76. The guide rollers 74 and 76 are mounted on shafts 78 and 80, respectively, so that the guide rollers 74 and 76 are freely rotating. The shafts 78 and 80, in turn, are attached to the inner surface 50 of the wall 32 of the elongated cylinder 26 at a point further than the rods 36 and 38 along the path of travel of the wire electrode 24 through the elongated cylinder 26. Preferably, the shafts 78 and 80 are coplanar. The plane of the shafts 78 and 80 is generally perpendicular to the longitudinal axis of the elongated cylinder 26, generally perpendicular to the plane defined by rods 36 and 38 and generally perpendicular to the plane defined by the pins 64 and 66 of the first pair of guide rollers 40. The guide rollers 74 and 76 can include means such as circumferential grooves, not shown, to serve as channels for the wire electrode 24 to prevent the wire electrode 24 from slipping on the guide rollers 74 and 76.

The third pair of guide rollers 44 includes guide rollers 82 and 84. The guide rollers 82 and 84 are mounted on shafts 86 and 88, respectively, so that the guide rollers 82 and 84 are freely rotating. The guide rollers 82 and 84 can include means, such as circumferential grooves, not shown, to serve as channels for the wire electrode 24 to prevent the wire electrode 24 from slipping on the guide rollers 82 and 84. The shafts 86 and 88 are, in turn, attached to the inner surface 50 of the wall 32 of the elongated cylinder 26 through motor resolvers 90 and 92 for axially retracting and extending the shafts 86 and 88 and the guide rollers 82 and 84, respectively. One shaft, 86 or 88, is disposed on either outer side of the rods 36 and 38. The shafts 86 and 88 are attached to the inner surface 50 of the wall 32 of the elongated cylinder 26 so that the shafts 86 and 88 can be moved further, preferably about 3 inches, away from each other and the rods 36 and 38, and back towards each other. Preferably, the shafts 86 and 88 are coplanar. The plane of the shafts 86 and 88 is generally perpendicular to the plane defined by the rods 36 and 38 and generally parallel to the longitudinal axis of the elongated cylinder 26 and generally parallel to the plane defined by the pins 64 and 66 of the first pair of guide rollers 40.

Figure 5:
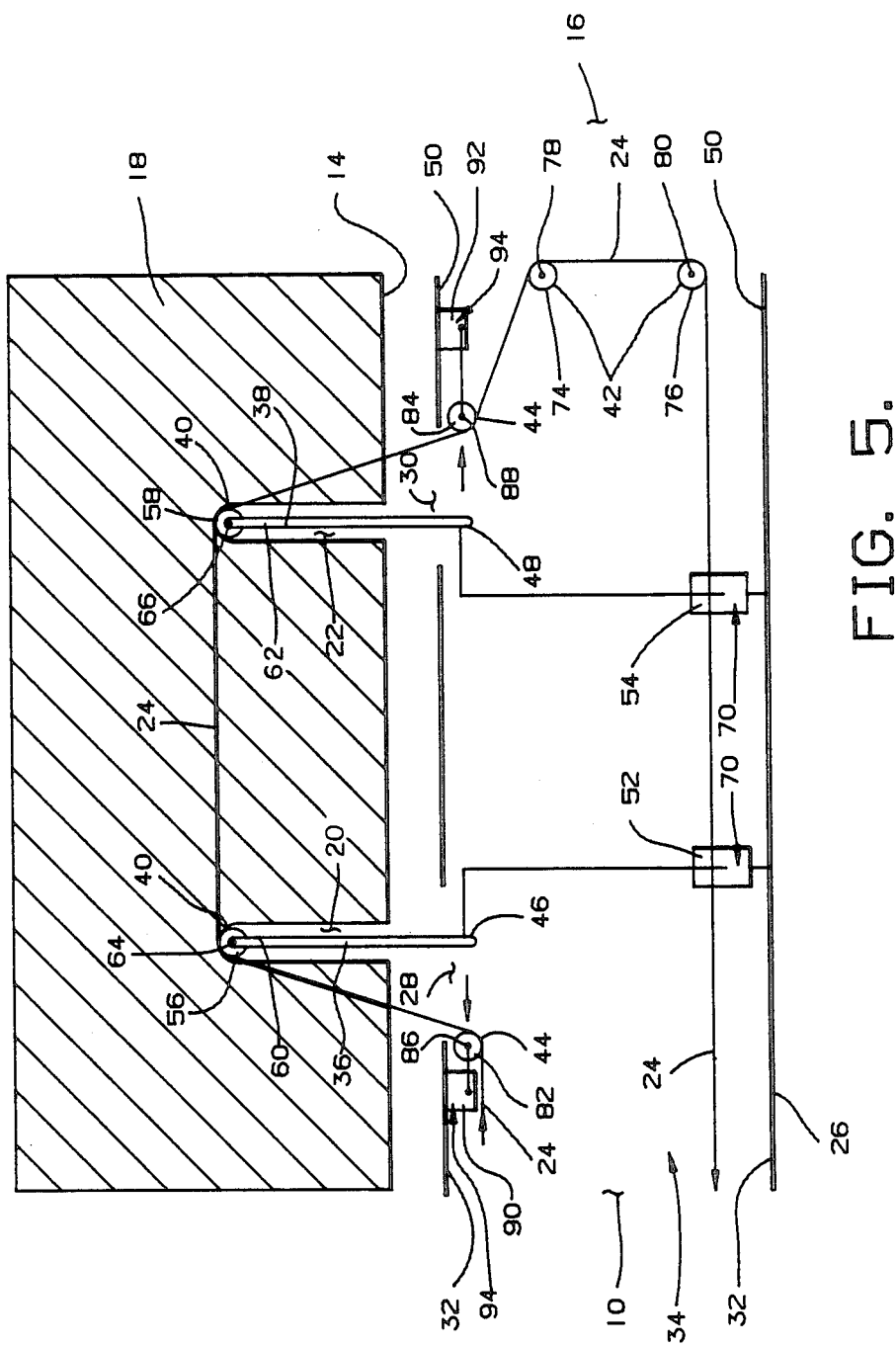
FIG. 5 is a schematic sectional view of the portion of the apparatus of the invention shown in FIGS. 3 and 4, showing the wire electrode disposed within the circumferential grooves within the wall of the rotor bore, and showing the wire electrode in its second position.

The movement of the shafts 86 and 88 away from and towards each other is controlled by a means 94, associated with the wire electrode guide means 34, for moving the wire electrode 24, when the wire electrode 24 is disposed within the axial groove 68 in the wall 14 of the bore 16, between a first position (FIG. 4) in which the distance along the wall 14 of the bore 16 between the point where the wire electrode 24 enters and leaves the axial groove 68 is the same as the distance between the circumferential grooves 20 and 22, and a second position (FIG. 5) in which the distance along the wall 14 of the bore 16 between the point where a wire electrode 24 enters and leaves the axial groove 68 is greater than the distance between the circumferential grooves 20 and 22. Preferably, the shafts 86 and 88, along with guide rollers 82 and 84, are spread apart in order to move the wire electrode 24 between the first and second positions. The means 94 can be any suitable device, such as the motor resolvers 90 and 92, for spreading the shafts 86 and 88, as well as the guide rollers 82 and 84, apart and together. Preferably, the servo-motor 72 sends an electrical signal to the motor resolvers 90 and 92, which, in turn, axially retract and extend the shafts 86 and 88 and the guide rollers 82 and 84, respectively, away from and towards each other.

The wire electrode guide means 34 of the apparatus 10 of the invention is adapted to guide the movement of the wire electrode 24 into and out of the elongated cylinder 26. The wire electrode 24 is threaded under the guide roller 82 and over the guide roller 56 on the second end 60 of the rod 36. The wire electrode 24 then spans the space between the guide roller 56 and the guide roller 58 on the second end 62 of the rod 38. The wire electrode 24 is then threaded over the guide roller 58 and underneath the guide roller 84. The wire electrode 24 then is threaded over the guide roller 74, over the guide roller 76 and out of the elongated cylinder 26.

The apparatus 10 of the invention further includes means 96 for continuously feeding the wire electrode 24 to the wire electrode guide means 34. The continuously feeding means 96 can be any suitable device, such as a conventional motor 98, that will continuously feed fresh wire electrode 24 to the wire electrode guide means 34 and will remove spent wire electrode 24 from the elongated cylinder 26.

The apparatus 10 of the invention includes means 100 for providing an electrical discharge through the wire electrode 24. Preferably, the electrical discharge means 100 includes a rectifier 102 and a current controller 104. The electrical discharge means 100 is preferably capable of generating an electrical potential difference sufficiently high to discharge current across the gap 106 between the wire electrode 24 and the wall 14 of the bore 16. Condensers, not shown, are then able to discharge a current across the gap 106 in the form of a spark having a current density on the order of about $10^6$ Angstroms per square inch at intervals from about 10 to about 30 microseconds. When the potential difference across the gap 106 drops to about 12 volts, the spark discharge is extinguished and the condensers recharge. This cycle is repeated thousands of times per minute. Each spark removes minute amounts of material from the wire electrode 24 and the wall 14 of the bore 16 of the rotor 18.

The elongated cylinder 26 can be manually inserted into and withdrawn from the bore 16 of the rotor 18. The elongated cylinder 26 is positioned within the bore 16 of the rotor 18 so that the openings 28 and 30 in the wall 32 of the elongated cylinder 26 and the rods 36 and 38 of the wire electrode guide means 34 are positioned within the bore 16 adjacent the circumferential grooves 20 and 22. The elongated cylinder 26 can include indicia, such as calibrated markings, to enable a user to properly position the elongated cylinder 26 within the bore 16 of the rotor 18. If desired, the elongated cylinder 26 can be mechanically inserted and positioned within, and withdrawn from, the bore 16 of the rotor 18 by any suitable device, such as a conventional motor. Preferably, a plurality of nylon chuck pads 108 are attached to the outer surface of the elongated cylinder 26 so that the nylon chuck pads 108 are disposed between the elongated cylinder 26 and the wall 14 of the bore 16 of the rotor 18 in order to electrically insulate the elongated cylinder 26 from the rotor 18 and to inhibit radial movement of the elongated cylinder 26 within the bore 16 of the rotor 18.

The apparatus 10 of the invention further includes means 110 for rotating the elongated cylinder 26 circumferentially within the bore 16. The rotating means 110 can be any suitable device, such as a motor resolver 112, that will rotate the elongated cylinder 26 circumferentially within the bore 16. The wire electrode guide means 34 rotates circumferentially within the bore 16 as a result of the rotation of the elongated cylinder 26 because the wire electrode guide means 34 is disposed within the elongated cylinder 26. Actuation of the motor resolver 112 is controlled by the servo-motor 72.

It should be noted that the rotor 18 is usually oriented on its side, and tilted slightly on an angle. The bore 16 of the rotor 18 is filled with a fluid having a poor electrical conductivity, such as oil, to act as an electrolyte. The electrolyte is constantly recirculated through a filtering system to remove machined metal and heat from the bore 16 of the rotor 18.

In order to operate the apparatus 10 of the invention to remove a circumferential section 12 from the wall 14 of the rotor 18, the elongated cylinder 26 is inserted into the bore 16 and is positioned adjacent the circumferential grooves 20 and 22 in the wall 14 of the bore 16.

Next, the motor resolvers 52 and 54 are actuated to extend the rods 36 and 38 through the openings 28 and 30, respectively, in the wall 32 of the elongated cylinder 26, radially toward the wall 14 of the bore 16 in the rotor 18. The electrical discharge means 100 provides an electrical discharge through the wire electrode 24 in order to machine an axial groove 68 in the wall 14 of the bore 16 of the rotor 18 that extends between the circumferential grooves 20 and 22 in the wall 14 of the bore 16 of the rotor 18. The depth of the axial groove 68 within the wall 14 of the bore 16 is the same as the depth of the circumferential grooves 20 and 22.

The wire electrode 24 is in its first position, as shown in FIG. 4. The motor resolvers 90 and 92 are actuated to move the wire electrode 24 between its first position and its second position and spread the guide rollers 82 and 84 apart. Simultaneously, with the actuation of the motor resolvers 90 and 92, the electrical discharge means 100 is actuated to enable the wire electrode 24 to widen the portion of the axial groove 68 at the inner surface of the wall 14 of bore 16 of the rotor 18. The motor resolvers 52 and 54 are then operated to retract the rods 36 and 38, and thus, the wire electrode 24, from the axial groove 68 back into the elongated cylinder 26.

The motor resolver 112 is then actuated to rotate the elongated cylinder 26 about 120° and the process for machining another axial groove 68 is repeated a second time. The motor resolver 112 is then actuated to rotate the elongated cylinder 26 another 120° and the process for machining another axial groove 68 is repeated a third time. Thus, preferably, three evenly spaced axial grooves 68 extending between the circumferential grooves 20 and 22, are machined in the wall 14 of the bore 16.

The rods 36 and 38 remain extended after the formation of the final axial groove 68 so that the wire electrode 24 remains disposed within the final axial groove 68 in its second position. The motor resolver 112 is then actuated to rotate the elongated cylinder 26 360°. Simultaneously, with the actuation of the motor resolver 112, the electrical discharge means 100 is actuated to enable the wire electrode 24 to machine an axially elongated circumferential groove 114 (FIGS. 1 and 7) in the wall 14 of the bore 16 of the rotor 18 and remove a circumferential section 12 from the wall 14 of the bore 16.

After the circumferential section 12 is removed from the wall 14 of the bore 16 of the rotor 18, the elongated cylinder 26 is withdrawn from the bore 16. The circumferential section 12, in the form of subsections, can then be removed from the bore 16 of the rotor 18 for further analysis.

Figure 6:
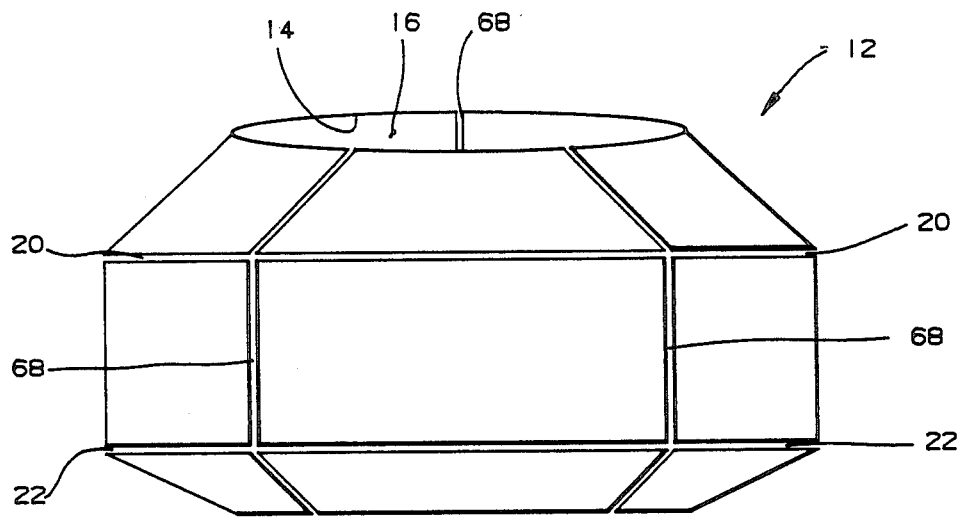
FIG. 6 is a perspective view of the section removed from the wall of the rotor bore by the apparatus of the invention.
Figure 7:
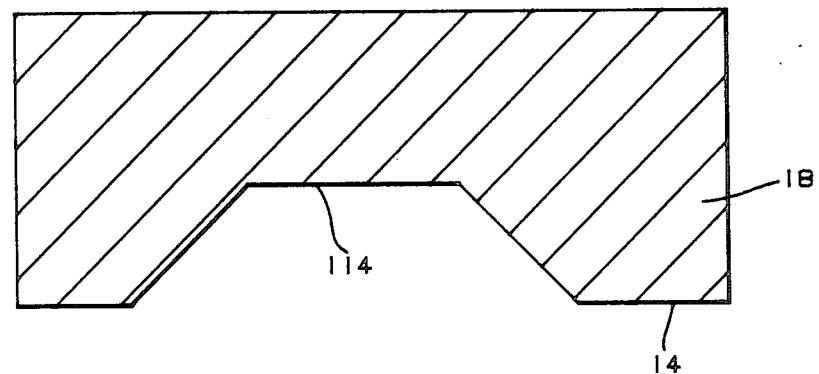
FIG. 7 is a sectional view of the wall of the rotor bore after the sample section has been removed by the apparatus of the invention.

The circumferential section 12 that is machined from the wall 14 of the bore 16 is shown in FIG. 6. The circumferential section 12 is in a plurality of pieces resulting from the circumferential grooves 20, 22 and 114 and the axial grooves 68, and, preferably, has an axial cross-section in the shape of an isosceles trapezoid. The profile of the wall 14 of the bore 16 of the rotor 18 after the circumferential section 12 is removed is shown in FIG. 7. The continued operation of the rotor 18 in which the wall 14 of the bore 16 of the rotor 18 has a profile as shown in FIG. 7 does not place undue stress on the wall 14 of the bore 16 of the rotor 18. Thus, the removal of the circumferential section 12 does not adversely affect the further operation of the rotor 18.

Generally, the wall 14 of the bore 16 of the rotor 18 is polished or honed after the removal of the circumferential section 12 from the bore 16 in order to remove the layer of recast material that remains on the surface of the wall 14 of the bore 16 of the rotor 18 as a result of the electromachining process.

What is claimed is:

1. An apparatus for the electrical discharge machining of a circumferential section from the wall of a bore in a metallic cylinder, said wall of said bore having a pair of spaced, radially outwardly extending circumferential grooves therein comprising:

a housing;

wire electrode guide means disposed within said housing;

means for continuously feeding a wire electrode to said wire electrode guide means;

means associated with said wire electrode guide means for moving a said wire electrode radially into and out of an axial groove extending between said circumferential grooves in said wall of said bore;

means associated with said wire electrode guide means for moving a said wire electrode, when a said wire electrode is disposed within said axial groove in said wall of said bore, between a first position in which the distance along said wall of said bore between the point where a said wire electrode enters and leaves said axial groove is the same as the distance between said circumferential grooves, and a second position in which the distance along said wall of said bore between the point where a said wire electrode enters and leaves said axial groove is greater than the distance between said circumferential grooves;

means for providing an electrical discharge through a said wire electrode; and means for rotating said housing circumferentially within said bore.

2. The apparatus of claim 1 wherein said metallic cylinder is a rotor.

3. The apparatus of claim 1 wherein said wire electrode guide means comprises a pair of spaced, radially movable rods and a pair of axially movable guide rollers disposed one on either side of said rods, said rods being spaced apart a distance equal to the spacing of said circumferential grooves in said wall of said bore.

4. The apparatus of claim 3 wherein said circumferential grooves in said wall of said bore are generally parallel to each other and said rods are generally parallel to each other.

5. The apparatus of claim 1 wherein said circumferential section has an axial cross-section in the shape of an isosceles trapezoid.

6. A method for the electrical discharge machining of a circumferential section from the wall of a bore in a metallic cylinder, said wall of said bore having a pair of spaced, radially outwardly extending circumferential grooves therein comprising the steps of:

positioning a wire electrode within said bore adjacent said circumferential grooves in said wall of said bore;

moving said wire electrode radially toward said wall of said bore;

forming at least one axial groove in said wall of said bore extending between said circumferential grooves by, firstly simultaneously and continuously when said wire electrode is just short of said wall of said bore, moving said wire electrode radially toward and within said wall of said bore, and providing an electrical discharge through said wire electrode, and secondly, moving said wire electrode between a first position in which the distance along said wall of said bore between the point where said wire electrode enters and leaves said axial groove is the same as the distance between said circumferential grooves, and a second position in which the distance along said wall of said bore between the point where said wire electrode enters and leaves said axial groove is greater than the distance between said circumferential grooves and, simultaneously, providing an electrical discharge through said wire electrode;

positioning said wire electrode within one said axial groove in said wall of said bore; and forming an axially elongated circumferential groove in said wall of said bore such that said circumferential section that is removed from said wall of said bore leaves a groove in said wall of said bore that has an axial cross-section in the shape of an isosceles trapezoid by, simultaneously and continuously, rotating said wire electrode circumferentially within said wall of said bore and providing an electrical discharge through said wire electrode.

7. The method of claim 6 wherein said metallic cylinder is a rotor.

8. The method of claim 6 wherein said wire electrode is supported by a wire electrode guide means, said wire electrode guide means being disposed within a housing and said wire electrode is positioned within said bore by inserting said housing and said wire electrode guide means within said bore adjacent said circumferential grooves.

9. The method of claim 6 wherein three said axial grooves are formed in said wall of said bore.

10. The method of claim 8, wherein said wire electrode guide means includes a pair of spaced, axially movable rods, said rods being spaced apart a distance equal to the spacing of said circumferential grooves in said wall of said bore, said wire electrode extending between said rods, and said wire electrode is moved radially toward said wall of said bore and is positioned within a said axial groove in said wall of said bore by radially extending said rods toward said wall of said bore.

11. The method of claim 10 wherein said wire electrode guide means includes a pair of axially movable guide rollers disposed one on either side of said rods, said wire electrode extending from one of said pair of rollers to said rods, between said rods and and from said rods to said other of said pair of rollers, and said wire electrode is moved between said first position and said second position by moving said guide rollers apart from each other.

12. The method of claim 11 wherein said wire electrode is rotated within said wall of said bore by rotating said housing and said wire electrode guide means within said bore.

13. The method of claim 6 further comprising the step of removing recast material from the portion of the surface of said wall of said bore in which said axially elongated circumferential groove was formed.

* * * * *